United States Patent [19]
Buchan et al.

[11] Patent Number: 5,753,984
[45] Date of Patent: May 19, 1998

[54] APPARATUS AND METHOD FOR STARTING A SINGLE-PHASE VARIABLE RELUCTANCE MOTOR

[75] Inventors: Ernest J. Buchan; Norman N. Fulton, both of Leeds, United Kingdom

[73] Assignee: Switched Reluctance Drives Limited, Harrogate, United Kingdom

[21] Appl. No.: 485,364

[22] Filed: Jun. 7, 1995

[30] Foreign Application Priority Data

Mar. 29, 1995 [GB] United Kingdom ............... 9506460

[51] Int. Cl.⁶ ............................................. H02K 7/10
[52] U.S. Cl. ................ 310/41; 310/68 A; 310/68 E; 310/69; 310/75 R
[58] Field of Search ........................ 310/41, 68 A, 310/68 E, 69, 75 R

[56] References Cited

U.S. PATENT DOCUMENTS

| | | | |
|---|---|---|---|
| 850,926 | 4/1907 | Gury | 172/36 |
| 2,226,697 | 12/1940 | Dalkowirz | 172/36 |
| 2,229,939 | 1/1941 | Service et al. | 172/36 |
| 3,432,699 | 3/1969 | Albinger, Jr. | 310/41 |
| 3,790,833 | 2/1974 | Hasebe | 310/162 |
| 3,846,603 | 11/1974 | Houser | 200/157 |
| 3,932,069 | 1/1976 | Giardini et al. | 417/420 |
| 4,054,764 | 10/1977 | Whiteley | 200/61 |
| 4,371,906 | 2/1983 | Alesio et al. | 361/51 |
| 4,386,307 | 5/1983 | Webby | 318/705 |
| 4,713,594 | 12/1987 | Bose | 318/685 |
| 4,716,326 | 12/1987 | Fisher | 310/89 |
| 4,728,833 | 3/1988 | Shiraki et al. | 310/268 |
| 4,737,674 | 4/1988 | Miyao | 310/268 |
| 4,748,387 | 5/1988 | Tanuma et al. | 318/254 |
| 4,795,953 | 1/1989 | Compter et al. | 318/696 |
| 4,812,691 | 3/1989 | Bertram et al. | 310/41 |
| 4,995,159 | 2/1991 | Hancock et al. | 29/596 |
| 5,117,144 | 5/1992 | Török | 310/269 |
| 5,122,697 | 6/1992 | Horst | 310/181 |
| 5,233,254 | 8/1993 | Fisher et al. | 310/261 |
| 5,239,217 | 8/1993 | Horst | 310/51 |
| 5,327,069 | 7/1994 | Radun et al. | 322/10 |
| 5,345,131 | 9/1994 | Török | 310/181 |
| 5,386,162 | 1/1995 | Horst | 310/51 |

FOREIGN PATENT DOCUMENTS

| | | | |
|---|---|---|---|
| 0 163 328 B1 | 12/1985 | European Pat. Off. | 310/68 R |
| 0 528 750 A2 | 2/1993 | European Pat. Off. | 310/68 R |
| 0 532 350 | 3/1993 | European Pat. Off. | H02P 7/00 |
| 0 533 413 | 3/1993 | European Pat. Off. | H02P 7/00 |
| 0 573 198 | 12/1993 | European Pat. Off. | H02P 6/02 |
| 54-153320 | 11/1979 | Japan | H02K 29/00 |
| 56-78368 | 6/1981 | Japan | 310/68 R |
| 2 259 150 | 3/1993 | United Kingdom | G01R 15/02 |
| WO 86/06891 | 11/1986 | WIPO | 310/41 |
| WO 92/12567 | 7/1992 | WIPO | 310/41 |

OTHER PUBLICATIONS

Chan & Bolton, *Development of sub-KW Single-phase Switched Reluctance Motor Drives*, pp. 527–531. School of Electrical, Electronics and Systems Engineering, University of Wales College of Cardiff.

Stephenson and Blake, *The Characteristics, Design and Applications of Switched Reluctance Motors and Drives*, (Jun. 1993, Nuremberg, Germany).

*Primary Examiner*—Steven L. Stephan
*Assistant Examiner*—Elvin G. Enad
*Attorney, Agent, or Firm*—Arnold, White & Durkee

[57] ABSTRACT

A single-phase switched reluctance motor is disclosed. The motor includes a stator having a plurality of projecting poles and a rotor rotatably disposed adjacent to the stator. The stator and rotor poles may be formed from laminations of ferromagnetic material. Energizing coils are wound around one or more of the stator poles. When the coils are energized, the rotor develops torque. In one embodiment, the motor includes a motor starting mechanism which sets the rotor into motion before the stator coils are energized so that the rotor is never static in a preferred position. In another embodiment, the motor includes a rotor positioning mechanism which positions the rotor in a preferred starting position before the stator coils are energized.

25 Claims, 6 Drawing Sheets

APPARATUS AND METHOD FOR STARTING A SINGLE-PHASE VARIABLE RELUCTANCE MOTOR

FIELD OF THE INVENTION

The present invention relates generally to variable reluctance motors, and more particularly, is directed to a single-phase variable reluctance motor which employs a mechanical starting mechanism to initiate positioning or rotation of the rotor so that it develops sufficient torque in the desired direction when the stator coils are activated thereby enabling reliable starting of the motor.

BACKGROUND OF THE INVENTION

Single-phase variable reluctance motors are well known in the art. They are particularly simple to construct and they can operate with a low-cost electronic controller. The single-phase variable reluctance drive is therefore an attractive choice for use in certain cost-sensitive applications such as fans and pumps.

These brushless motors employ one or more exciting windings and a magnetic circuit to produce mechanical torque which is substantially proportional to the square of the winding ampere-turns and to the angular rate of change of the magnetic circuit inductance, which is a function of the displacement of the rotor in the motor. Typically, these motors employ a stator containing one or more windings and a rotor mounted coaxially relative to the stator on bearings. Displacement of the rotor relative to the stator produces a variation of the reluctance of the magnetic circuit.

The torque produced by a variable reluctance motor is proportional to the product of the square of the winding ampere-turns and the angular rate of change of inductance as a function of rotor displacement. Accordingly, motor torque that is positive with respect to some arbitrary reference can only be developed when winding ampere-turns are sustained during an interval in which the inductance increases with rotor displacement. Conversely, negative motor torque is developed when winding ampere-turns are sustained during an interval in which the inductance decreases with rotor displacement. In order to secure continuous rotation of the variable reluctance motor, it is necessary to apply ampere-turns to the motor winding during intervals of increasing inductance and to decrease or eliminate such ampere-turns during intervals of decreasing inductance.

From the foregoing, it is apparent that the winding(s) of the variable reluctance motor must be excited from a time varying source. Furthermore, the time variations of the source must be synchronized with the mechanical rotation of the rotor so that winding current is supplied to the motor during intervals in which the inductance increases with displacement and so that such current is decreased or, preferably, eliminated during the intervals in which the inductance is decreasing with rotor displacement. When a time-invariant source of electrical energy, such as a direct current source, is used, a controller is required to produce synchronized pulsations of voltage or currents. The instants at which the pulses are applied to and removed from the winding(s) are determined by a rotor position transducer (RPT) which sends data describing the rotor position to the controller.

The single-phase variable reluctance motor, although simple to construct, has several drawbacks.

FIG. 1 shows a typical plot of starting torque against angular rotor displacement for a known single-phase variable reluctance motor. It will be seen that the machine only develops torque in, for example, the positive direction between point 2 and point 4. To rotate in the positive direction, it would preferably only have current supplied to its exciting coil(s) when the rotor position is between points 2 and 4 and it preferably would not have current supplied when the rotor position is between points 5 and 6. In the regions between points 1 and 2 and points 4 and 5, current flowing will produce virtually no torque. It is therefore clear that the average torque in the desired direction over a complete cycle is much less than the peak torque $T_{max}$.

As FIG. 1 indicates, the average starting torque of single-phase variable reluctance motors is low. This is generally not a problem for low-torque applications such as fans, but is a problem for high-torque applications such as conveyors on assembly lines. A more significant drawback with single-phase variable reluctance motors that is clear from FIG. 1 is that the rotor may assume a position at rest at which little or no torque is developed in the desired direction and hence from which it is impossible to start the motor. This corresponds to any position in the regions defined by points 1–2 and points 4–6.

A solution to this problem has been to use small permanent magnets to "park" the rotor in a position at which it can generate adequate starting torque, e.g. point 3 in FIG. 1. Such a solution has been described, e.g. in European Patents Nos. 163328 and 601818. These patents disclose the use of one or more small permanent magnets suitably positioned in the stator structure at an appropriate angle for "parking" the rotor in a position where sufficient torque is developed to restart the motor. As described above, there is a critical region in which the rotor must not stop if the motor is to start again. The torque developed by the magnetic field of the magnet in this critical region must be sufficient to overcome the friction due to the bearings or the rotor will stop in the critical area. The motor will not start if this should occur. The parking magnets ensure that the rotor does not stop in this critical region.

One disadvantage with parking magnets is simply the additional cost of the magnets themselves. Further, the parking magnets take up physical space and require additional manufacturing steps to properly position the parking magnets. Still further the torque such magnets can develop in the motor is limited. Thus, while they are a useful means of urging a rotor out of a zero torque position they will not be effective in situations in which the load is greater than the torque developed by the magnets above.

The present invention is directed to overcoming these and other disadvantages of the prior art.

SUMMARY OF THE INVENTION

The present invention is directed to an apparatus and method for starting a single-phase variable reluctance motor. The motor is defined by a stator having a plurality of projecting poles defining a principal axis and a rotor mounted on a rotatable shaft co-axial with the principal axis of the stator. In one embodiment the stator poles are inwardly projecting and terminate at a central bore. In that embodiment the rotor is rotatably disposed within the central bore. The stator poles are generally arranged symmetrically around the stator. The rotor is mounted to a shaft and has a plurality of poles, again generally symmetrically disposed. The stator and rotor are typically formed from laminations of ferromagnetic material. Energizing coils are wound around one or more of the stator poles.

In one aspect of the invention, the motor is started by setting the rotor into rotation in the desired direction before power is supplied to the energizing coils. This method eliminates the situation where the rotor is at rest in a non-preferred position when the coils are energized (i.e. either where no torque is developed or where torque of the wrong sense is developed), thus insuring reliable restart of the motor. The invention provides a motor starting mechanism engageable with the rotor shaft for setting the rotor into motion. In one embodiment, the motor starting mechanism includes an ON button defined by a shaft, a pushing member mounted to one end of the shaft and a pin mounted to the other end of the shaft. The shaft of the ON button has a plurality of teeth and a curvilinear cut-out section disposed below the teeth along its mid-section. The curvilinear cut-out section fits partially around, and is aligned adjacent to, the rotor shaft. A plurality of teeth are disposed on the rotor shaft which engage with the teeth on the shaft of the ON button when the ON button is depressed.

In another aspect of the invention, the motor is started by positioning the rotor in a position where torque of the desired direction will be developed when power is supplied to the energizing coils. This method also insures reliable restart. The invention provides a rotor positioning mechanism engageable with the rotor shaft for aligning the rotor in the preferred position. In one embodiment, the rotor positioning mechanism includes an ON button defined by a shaft, a pushing member mounted to one end of the shaft, and a pin mounted to the other end of the shaft. The shaft of the ON button has a curvilinear cut-out section along its mid-section which fits partially around, and is aligned adjacent to, the rotor shaft. The rotor shaft has a flat portion formed on its cylindrical surface. The curvilinear cut-out section of the shaft engages the rotor shaft when the ON button is depressed thereby rotating the rotor shaft until the flat portion is aligned with a straight portion of the ON button shaft. This configuration places the rotor in the required position.

The present invention further provides a disengagement mechanism, disposed below the ON button, for disengaging the shaft of the ON button from the rotor shaft and maintaining the ON button in an "ON" position. The disengagement mechanism includes a ramp, a stopping member mounted to the ramp, a curve-shaped guide member adjacent to the stopping member and a pair of leaf springs mounted on opposite sides of the stopping member. A micro-switch having a switch activating member is also provided which connects the energizing coils to a power supply.

BRIEF DESCRIPTION OF THE DRAWINGS

The foregoing and other features of the present invention will be best appreciated with reference to the detailed description of the invention, which follows when read in conjunction with the accompanying drawings, wherein.

DETAILED DESCRIPTION OF THE INVENTION

Figure 1:
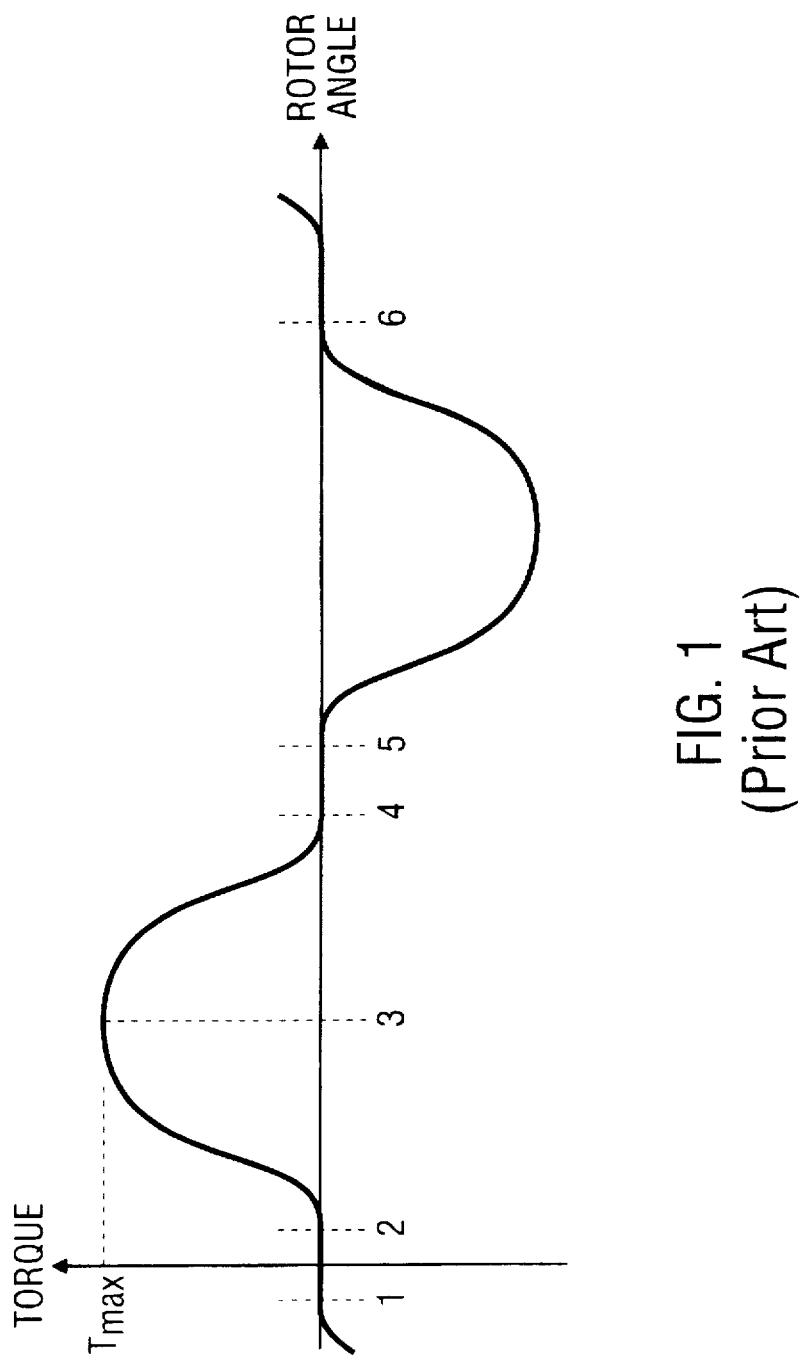
FIG. 1 shows an exemplary plot of starting torque against angular displacement for a single-phase switched reluctance motor.
Figure 2:
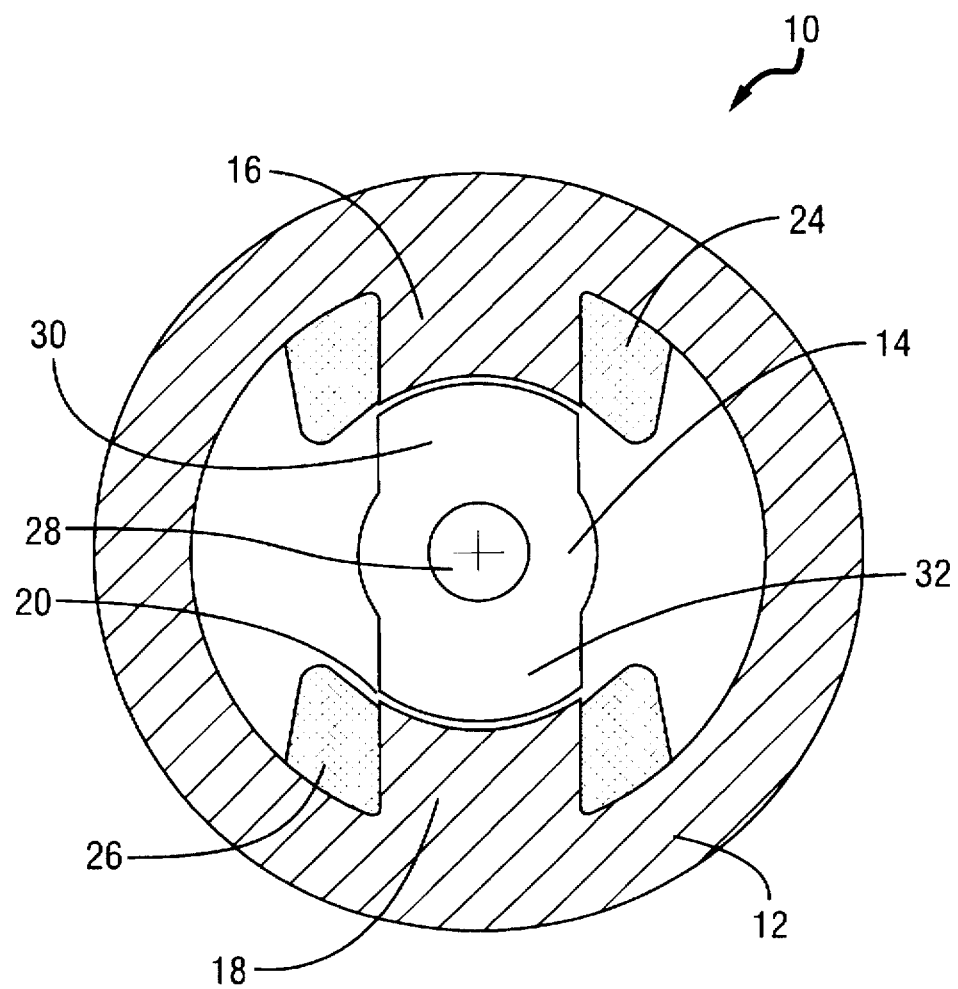
FIG. 2 is a diagram of a prior art single-phase variable reluctance motor.

Turning now to the drawings and referring initially to FIG. 2, a single-phase variable reluctance motor is shown generally by reference numeral 10. For the sake of illustration, the simplest form of motor having two stator poles and two rotor poles (i.e. a 2/2 motor) is shown here. Those skilled in the art will recognize that 4/4, 6/6 etc., combinations are equally possible and that the present invention applies equally to such motors. Moreover, the present invention is applicable to inverted motors where the stator has radially outwardly projecting poles and is positioned within a bore of an outer rotating rotor. The present invention is also applicable to linear reluctance machines in which the moving member is referred to in the art as a rotor. The term 'rotor' used herein is intended to embrace such moving members of linear motors.

Referring to FIG. 2, the motor 10 comprises a stator 12 and a rotor 14. The stator 12 has a pair of projecting poles 16 and 18 that define a principal stator axis extending outward from FIG. 2. In FIG. 2, the stator poles are inwardly extending and terminate at a central bore 20. The poles 16 and 18 are disposed 180 degrees with respect to each other. The stator 12 and rotor 14 are formed from laminations of a ferromagnetic material. Energizing coils 24 and 26 are wound around each pole 16 and 18, respectively. In one embodiment, the energizing coils 24 and 26 comprise 220 turns around each pole 16 and 18, although a different number of turns may be used. The coils 24 and 26, when energized, cause a temporary magnetization of the stator poles 16, 18.

The rotor 14 has a plurality of projecting poles 30 and 32. The rotor is mounted to a rotatable shaft 28 co-axial with the principal axis of the stator 12. In FIG. 2, the rotor poles are outwardly extending and the rotor 14 is rotatably disposed in the central bore 20.

When the energizing coils 24 and 26 are energized by a control system (not shown), typically by applying a voltage to them from a power source (not shown), the poles 16 and 18 become "magnetized" and thus form electromagnetic poles. These magnetic poles attract the ferromagnetic poles 30 and 32 on the rotor 14 thereby imparting a torque on the rotor.

Figure 3A:
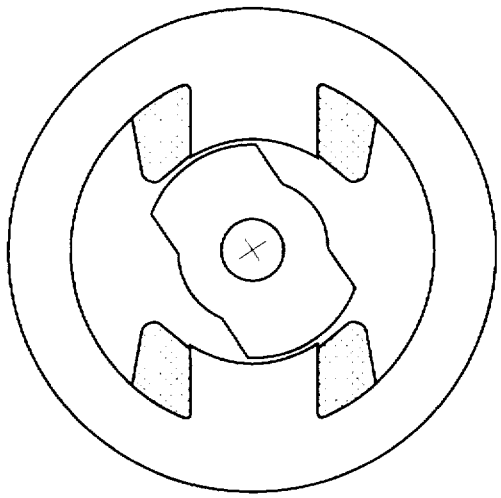
FIGS. 3A–D are diagrams of the motor shown in FIG. 2 showing various positions of the rotor relative to the stator poles.
Figure 3B:
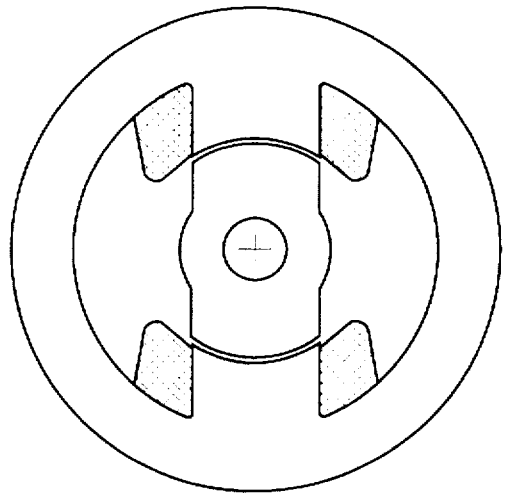
Figure 3C:
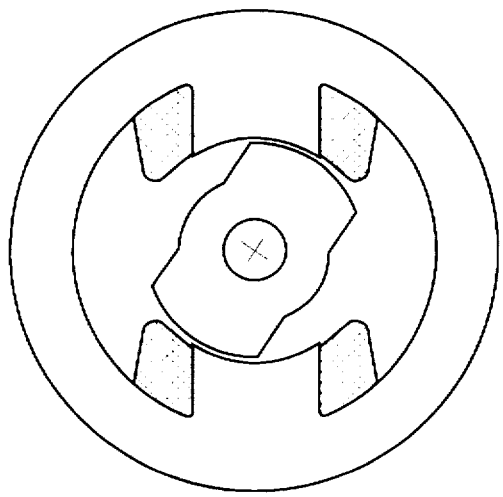
Figure 3D:
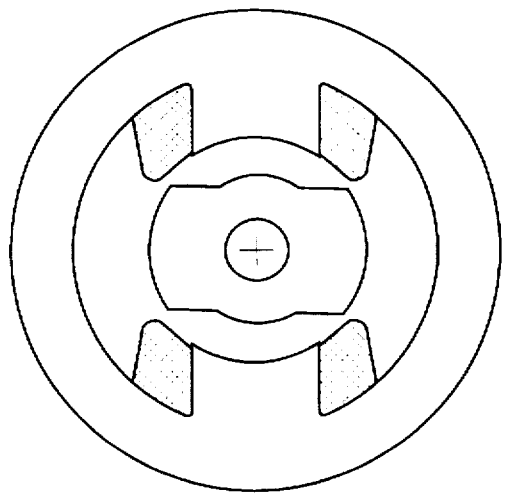

Assuming a clockwise rotation, when the rotor 14 is in position A (shown in FIG. 3A), the stator poles 16 and 18 are energized and the torque imparted on the rotor 14 is substantial. The stator poles 16 and 18 remain energized until the rotor 14 approaches the fully aligned position, shown in FIG. 3B. In the fully aligned position the torque imparted on the rotor 14 is zero. During operation, at or around the instant that the rotor 14 passes through this position, the stator poles 16 and 18 are de-energized, thus causing the rotor 14 to freely rotate. If the stator poles 16 and 18 were not de-energized at or near this point, a negative torque would be applied to the rotor 14 thus attempting to reverse its direction of rotation. As explained above, if the rotor 14 comes to rest in the fully aligned position when the motor 10 is turned "OFF", it cannot be restarted by the electromagnetic force generated by the "energized" stator poles 16 and 18 alone. It remains stuck in this position.

In position C (shown in FIG. 3C), the stator poles 16 and 18 remain de-energized thereby allowing the rotor 14 to freely rotate. The rotor 14 freely rotates in the clockwise direction until it reaches position D (shown in FIG. 3D), known as the minimum inductance position. The torque developed by the rotor 14 in this position is zero. At or around the instant that the rotor 14 passes through position D, the stator poles 16 and 18 are once again energized thereby imparting a torque to the rotor which increases to a high value once the rotor 14 again reaches position A. The rotor 14 rotates through 180 degrees as it rotates from position A, through positions B, C, and D and back to position A, as shown in FIGS. 3A–D.

The object of this invention is to overcome the problem in the prior art devices of being unable to restart the motor 10 when it stops in one of the positions at which it cannot develop adequate starting torque in the desired direction. In most motor systems, the activation of the motor system involves mechanical movement or travel of a switching device. In the present invention, part of this mechanical travel is used to either spin the rotor in a desired direction or position the rotor in a desired position from which it will start. In one embodiment, this invention overcomes this problem by providing a device which "jump" starts the rotor 14 before the coils are activated. With this device, although the rotor 14 may be in one of the fully aligned or unaligned positions at the instant that power is applied to the system, it will be dynamic at that point so that a fraction of a second later the rotor will be in a position in which torque can be developed in the desired direction. This configuration therefore insures reliable restart of the motor 10. Moreover, in one embodiment of the present invention, the device which "jump" starts the motor is an ON button used to start the motor.

Figure 4:
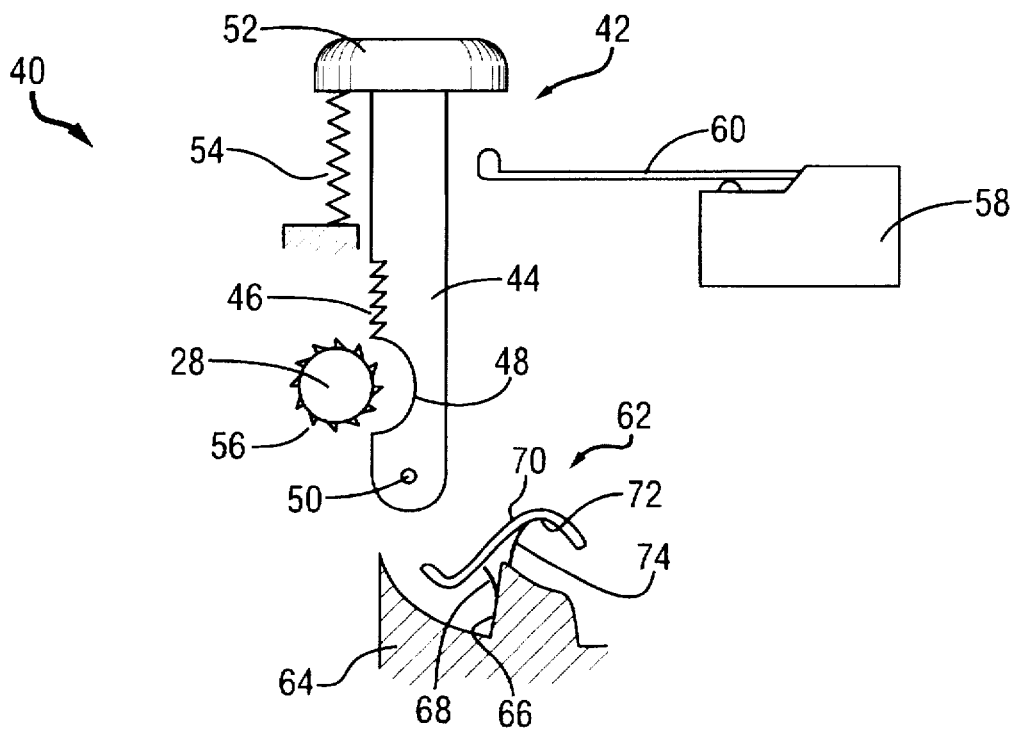
FIG. 4 is a diagram of one embodiment of a motor starting device for a single-phase variable reluctance motor according to the present invention shown in the "OFF" position.

Referring now to FIG. 4, one embodiment of the motor starting device is shown generally by reference numeral 40. The motor starting device 40 comprises a starting member which, in FIG. 4, comprises a switch actuator, which in the embodiment of FIG. 4 is an ON button 42. The ON button 42 is defined by a shaft 44 which has a plurality of teeth 46 along its mid-section and a curvilinear cut-out section 48 disposed below the teeth 46. The shaft 44 has a pin 50 mounted to its distal end. The ON button 42 is further defined by a disk-shaped pushing member 52 which is mounted to the proximal end of the shaft 44. Both the shaft 44 and the disk-shaped pushing member 52 are preferably formed of a metal or thermoplastic material.

Embodiments are envisioned where ON button 42 is used both to start the motor (when placed in one position) and stop the motor (when placed in a second position). Alternate embodiments are envisioned where ON button 42 is used to start the motor and where the motor is switched OFF by a separate OFF switch or a supplied OFF signal. In such embodiments, the ON button 42 may comprise a microswitch that produces a pulse when ON button 42 is depressed. The pulse from the micro-switch would latch the associated control system ON and the ON button 42 would return to its quiescent position. In the embodiment illustrated in FIG. 4, ON button 42 serves both to turn the motor ON and OFF.

The curvilinear cut-out section 48 of the shaft 44 fits partially around, and is aligned adjacent to, the rotor shaft 28. The motor starting device 40 assumes this position when the motor 10 is in the non-actuated "OFF" position, i.e., when the rotor 14 is at rest. The device 40 is activated by pushing down on the disk-shaped pushing member 52 of the ON button 42. A spring member 54 attached to the ON button 42 at the disk-shaped pushing member 52 is provided to apply a recoil force to the ON button 42. Alternatively, the spring member 54 may be attached to the shaft 44.

Figure 5:
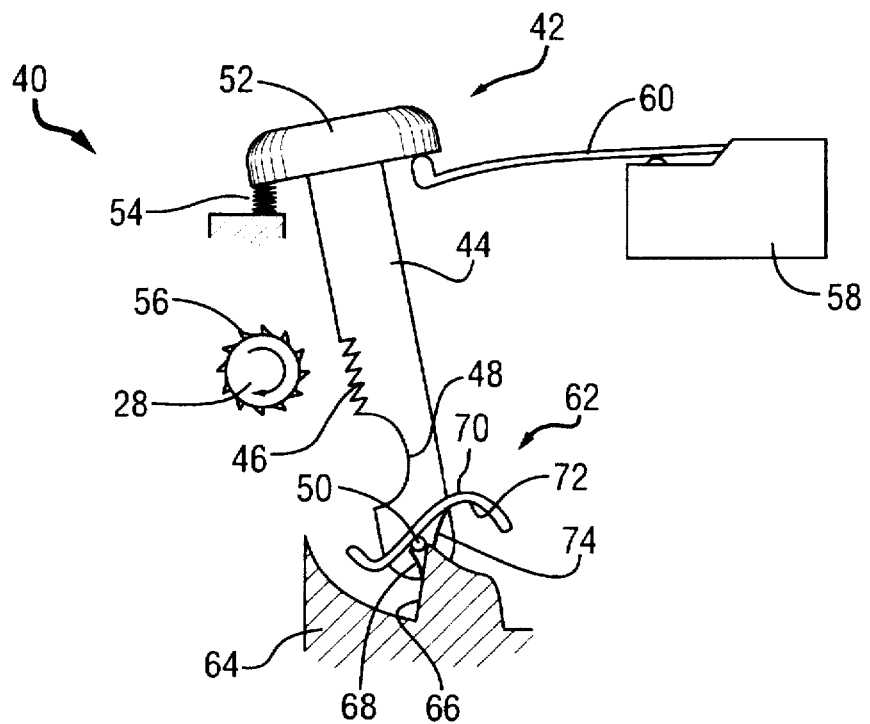
FIG. 5 is a diagram of the motor starting device shown in FIG. 4 in the "ON" position.

As the ON button 42 is pushed downward upon activation, the teeth 46 on the shaft 44 engage teeth 56 disposed on the rotor shaft 28. The downward force of movement of the shaft 44 imparts a torque via the teeth 46 and 56 to the rotor shaft 28 thereby causing it to rotate. Once the ON button 42 has been pushed through a predetermined distance, which can be determined by those of ordinary skill in the art, it activates a micro-switch 58. Once activated, the micro-switch 58 activates a control system (not shown) which controls the supply of current from a power source (also not shown) to the energizing coils 24 and 26. The micro-switch 58 employs a switch activating member 60. When the switch activating member 60 is in the horizontal position, as shown in FIG. 4, the circuit connecting the power source to the energizing coils 24 and 26 is open. When the switch activating member 60 is pushed down by the contact of the disk-shaped pushing member 52 of the ON button 42, as shown in FIG. 5, the circuit connecting the power source to the energizing coils 24 and 26 is closed.

A disengagement device 62 is provided for disengaging the shaft 44 from the rotor shaft 28 and maintaining the ON button 42 in the actuated or "ON" position, i.e. when the motor 10 is running. The disengagement device 62 comprises a ramp 64 having a downward slope. The pin 50 follows the downward slope of the ramp 64 as the ON button 42 is pushed downward. Preferably, the disk-shaped pushing member 52 contacts the switch activating member 60 at, or immediately after, the instant that the pin 50 comes into contact with the ramp 64. Any earlier activation of the micro-switch 58 might cause the teeth 46 and 56 to grind as the rotor shaft 28 begins to rotate upon activation. As the pin 50 follows the downward slope of the ramp 64 it pulls the shaft 44 away from the rotor shaft 28. The pin 50 follows the slope of the ramp 62 until it reaches a stopping member 66 which is mounted to, or alternatively integrally formed with, the ramp. Once the pin 50 reaches the stopping member 66, the recoil action of the spring member 54 forces the ON button 42 upward past a leaf spring 68, mounted at one end to the stopping member, along a curve-shaped guide member 70 adjacent the stopping member until the pin 50 latches into a flat portion 72 formed in the guide member 70 thereby locking the ON button 42 in the "ON" position, as shown in FIG. 5.

In the "ON" position, the switch member 60 is held in the closed position by the disk-shaped pushing member 52. In this position, the power source, controlled by the control circuit, remains connected to the energizing coils 24 and 26 thereby energizing them and causing the rotor 14 to continuously rotate. The guide member 70 keeps the shaft 44 pulled away from the rotor shaft 28 thereby preventing it from interfering with its rotation.

The motor 10 is turned OFF by pushing down on the ON button 42. As the ON button 42 is pushed downward, the pin 50 on the shaft 44 follows a clockwise path along the curvature of the guide member 70 past a second leaf spring 74 mounted to the stopping member. The first leaf spring 68 prevents the pin 50 from following a counter-clockwise path along the curvature of the guide member 70. The pin 50 follows the curvature of the guide member 70 until it comes in contact with the ramp 64. Once it contacts the ramp 64, the pin 50 follows the slope of the ramp until it has cleared the guide member 70 after which the recoil action of the spring member 54 restores the ON button 42 to the starting position, i.e., the "OFF" position (shown in FIG. 4). In the "OFF" position, the micro-switch 58 is deactivated which in turn shuts OFF the motor 10. Alternate embodiments are envisioned where the teeth 46 and 56 on the shafts 28 and 44 are replaced with sleeves of high friction material, with roughened areas, or the like.

Figure 6:
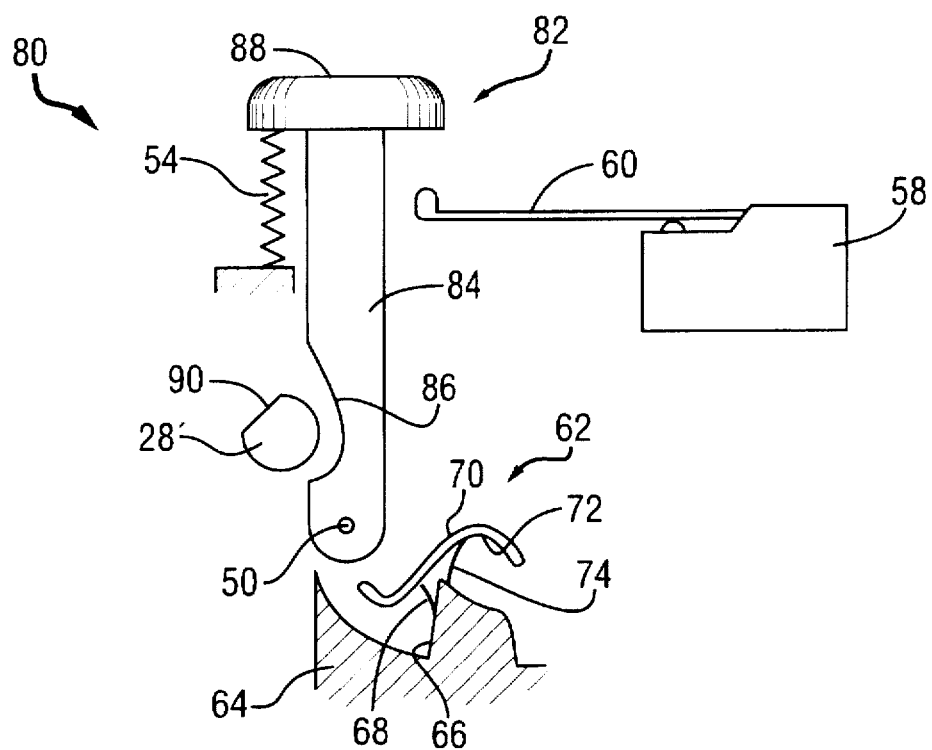
FIG. 6 is a diagram of another embodiment of a motor starting device for a single-phase variable reluctance motor according to the present invention shown in the "OFF" position.

An alternate embodiment of a motor starting device according to the present invention is shown generally in FIG. 6 by reference numeral 80. The starting device 80 in this embodiment comprises an ON button 82. The ON button 82 is defined by a shaft 84. The shaft 84 has a curvilinear cut-out section 86 disposed in its mid-section. The ON button 82 is further defined by a disk-shaped pushing member 88 which is mounted to the proximal end of the shaft 84. Both the shaft 84 and the circular-shaped pushing member 88 are preferably formed of a metal or thermoplastic material.

The curvilinear cut-out section 86 of the shaft 84 fits partially around, and is aligned adjacent to, the rotor shaft 28'. The motor starting device 80 assumes this position when the motor 10 is in the "OFF" position, i.e., when the rotor 14 is at rest. The device 80 is activated by pushing down on the disk-shaped pushing member 88 of the ON button 82. As the ON button 82 is pushed downward the curvilinear cut-out section 86 of the shaft 84 engages the rotor shaft 28' thereby rotating it. The rotor shaft 28' has a flat section 90 along its cylindrical surface. The rotor shaft 28' is rotated by the shaft 84 until the flat section 90 is aligned with the straight portion of the shaft 84. This position is preselected to be a position at which the rotor will develop high torque in the desired direction. A spring element or the like may be is mounted to the distal end of the shaft 84 to facilitate engagement of the shaft 84 with the rotor shaft 28'.

The motor starting device 80 is different from the motor starting device 40. Rather than setting the rotor 14 into motion in the preferred direction, the motor starting device 80 aligns the rotor 14 at a preferred starting position, so that when the stator coils 24 and 26 are activated, the motor 10 can be started. In this sense, the motor starting device 80 functions as a rotor positioning device.

Figure 7:
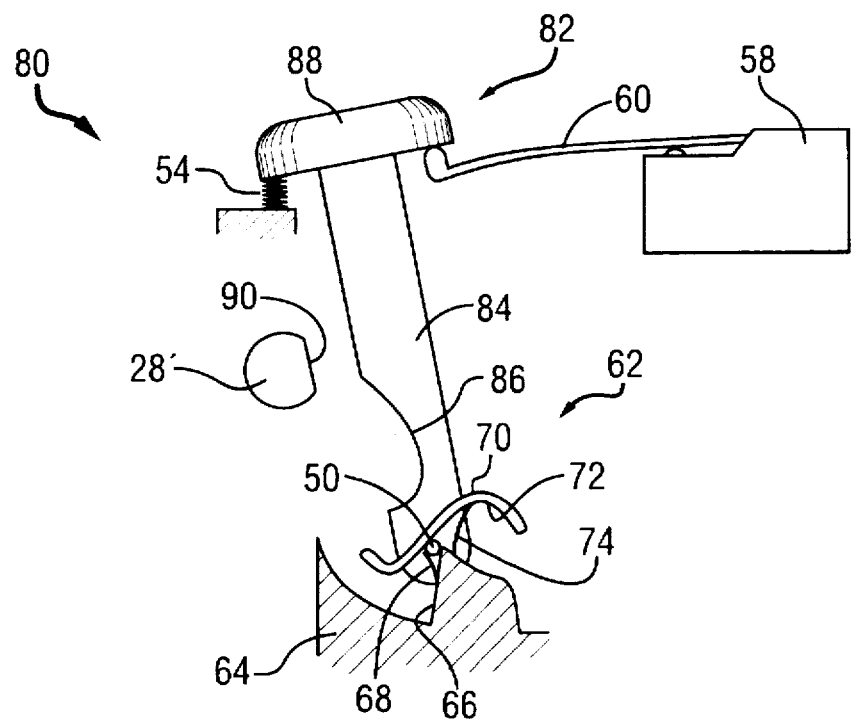
FIG. 7 is a diagram of the motor starting device shown in FIG. 6 in the "ON" position.
Figure 8A:
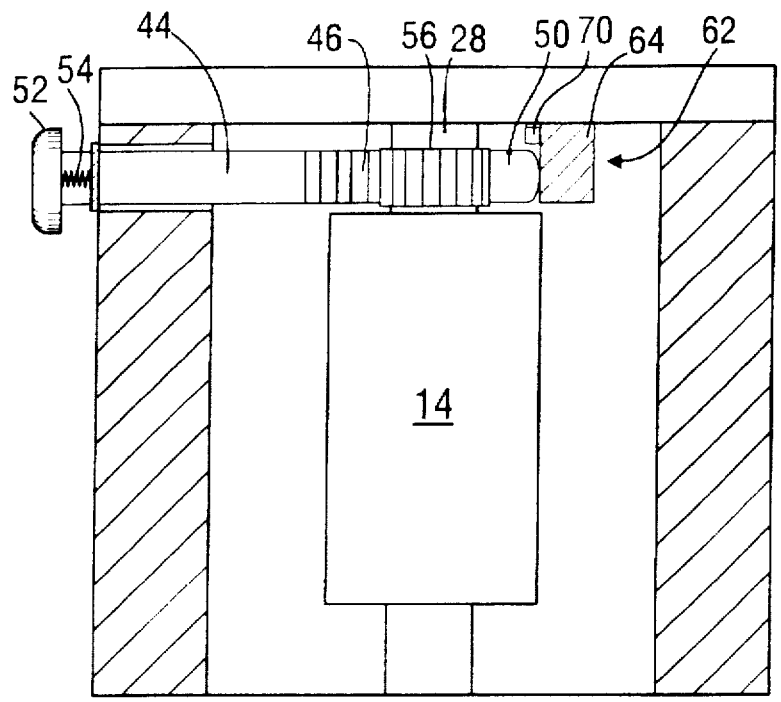
FIG. 8A is a sectional elevation view of a single-phase variable reluctance motor including a motor starting device in accordance with the present invention.
Figure 8B:
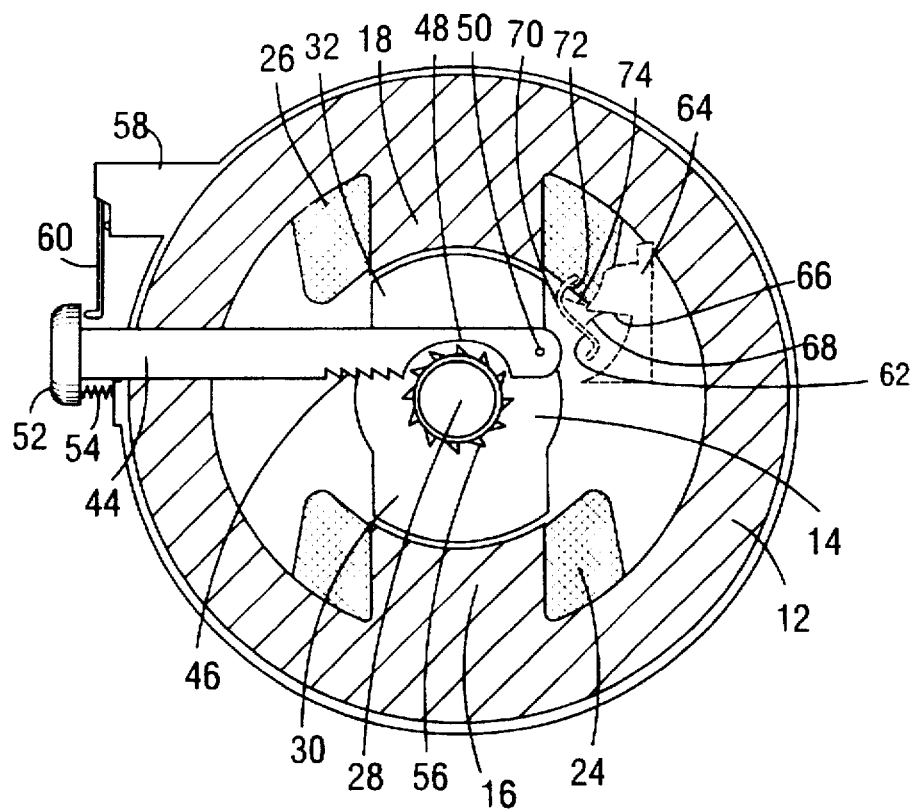
FIG. 8B is a sectional plan view of a single-phase variable reluctance motor including a motor starting device in accordance with the present invention.

The motor starting device 80 is otherwise similar to the motor starting device 40. The disengagement mechanism 62 and micro-switch 58 can be identical. In the later embodiment, the micro-switch 58 is not activated by the ON button 82 until after the rotor 14 is in the desired position, i.e., where the flat section 90 in the rotor shaft 28' is aligned with the straight portion of the shaft 84. This preferably occurs when the pin 50 first contacts the ramp 64. FIG. 7 shows the motor starting device in the "ON" position.

While the present invention is susceptible to various modifications and alternative forms, specific embodiments have been shown by way of example in the drawings and description herein. However, it should be understood that the invention is not intended to be limited to the particular forms disclosed. Rather, the invention is intended to cover all modifications, equivalents and alternatives falling within the spirit and scope of the invention as defined by the appended claims.

What is claimed is:

1. A single-phase variable reluctance motor system, comprising:

a stator having a plurality of stator poles defining a principal axis;

an energizing coil wound around at least one of the stator poles;

a rotor having a plurality of rotor poles, the rotor being mounted to a rotor shaft; and a motor starting mechanism engagable with the rotor shaft for setting the rotor into rotation before power is supplied to the energizing coil.

2. The single-phase variable reluctance motor system as defined in claim 1, wherein the motor starting mechanism comprises a switch actuator, where movement of the switch actuator sets the rotor into rotation, and wherein movement of the switch actuator results in the application of power to the energizing coil after the rotor has been placed into rotation.

3. The single-phase variable reluctance motor system as defined in claim 2, wherein the switch actuator is defined by a shaft having first and second ends, a disk-shaped pushing member mounted to the first end of the shaft and a pin mounted to the second end of the shaft.

4. The single-phase variable reluctance motor system of claim 1 wherein the switch actuator is defined by a shaft and wherein a portion of the shaft of the switch actuator engages a portion of the rotor shaft when the switch actuator is activated to set the rotor into rotation.

5. The single-phase variable reluctance motor system of claim 4 where the portion of the shaft comprises high friction material.

6. The single-phase variable reluctance motor system of claim 4 wherein the portion of the rotor shaft comprises a roughened area.

7. The single-phase variable reluctance motor system of claim 1 wherein the stator poles are inwardly projecting and terminate at a central bore, wherein the rotor poles are outwardly projecting, and wherein the rotor is mounted to a rotatable shaft in the central bore.

8. A single-phase variable reluctance motor system, comprising:

a stator having a plurality of stator poles defining a principal axis;

an energizing coil wound around at least one of the stator poles;

a rotor having a plurality of rotor poles, the rotor being mounted to a rotor shaft; and a motor starting mechanism disposed adjacent to one end of the rotor shaft, the motor starting mechanism engagable with the rotor shaft for setting the rotor into rotation before power is supplied to the energizing coil, the motor starting mechanism comprising:

a switch actuator defined by a shaft having a first end and a second end, the actuator shaft having a plurality of teeth and a curvilinear cutout section being sized to fit partially around and to receive the rotor shaft.

9. A single-phase variable reluctance motor system, comprising:

a stator having a plurality of stator poles defining a principal axis;

an energizing coil wound around at least one of the stator poles;

a rotor having a plurality of rotor poles, the rotor being mounted to a rotor shaft, and wherein a plurality of teeth are disposed on the rotor shaft; and a motor starting mechanism disposed adjacent to one end of the rotor shaft, the motor starting mechanism engagable with the rotor shaft for setting the rotor into rotation before power is supplied to the energizing coil, the motor starting mechanism comprising:

a switch actuator defined by a shaft having a first end and a second end, the actuator shaft having a plurality of teeth and a curvilinear cutout section being sized to fit partially around and to receive the rotor shaft;

wherein the teeth on the shaft of the switch actuator engage with the teeth on the rotor shaft when the switch actuator is depressed to set the rotor in rotation when the actuator is depressed.

10. A single-phase variable reluctance motor system, comprising:

a stator having a plurality of stator poles defining a principal axis;

an energizing coil wound around at least one of the stator poles;

a rotor having a plurality of rotor poles, the rotor being mounted to a rotor shaft and wherein a plurality of teeth are disposed on the rotor shaft;

a motor starting mechanism disposed adjacent to one end of the rotor shaft, the motor starting mechanism engagable with the rotor shaft for setting the rotor into rotation before power is supplied to the energizing coil, the motor starting mechanism comprising:

a switch actuator defined by a shaft having a first end and a second end, the actuator shaft having a plurality of teeth;

a pushing member mounted to the first end of the switch actuator shaft and a pin mounted to the second end of the switch actuator shaft, wherein the teeth on the shaft of the switch actuator engage with the teeth on the rotor shaft when the switch actuator is depressed to set the rotor in rotation when the switch actuator is depressed; and a disengagement mechanism, disposed adjacent to the second end of the switch actuator shaft, for receiving the pin mounted to the shaft of the switch actuator as the switch actuator is depressed, to guide the shaft of the switch actuator away from the rotor shaft into a disengaged position and to maintain the switch actuator in an "actuated" position.

11. A single-phase variable reluctance motor system, comprising:

a stator having a plurality of stator poles defining a principal axis;

an energizing coil wound around at least one of the stator poles;

a rotor having a plurality of rotor poles, the rotor being mounted to a rotor shaft and wherein a plurality of teeth are disposed on the rotor shaft;

a motor starting mechanism engagable with the rotor shaft for setting the rotor into rotation before power is supplied to the energizing coil, the motor starting mechanism comprising:

a switch actuator defined by a shaft having a first end and a second end, the switch actuator shaft having a plurality of teeth and a curvilinear cutout section being sized to fit partially around and to receive the rotor shaft;

a pushing member mounted to the first end of the switch actuator shaft and a pin mounted to the second end of the switch actuator shaft, wherein the teeth on the rotor shaft engage with the teeth on the shaft of the switch actuator when the switch actuator is depressed to set the rotor in rotation when the switch actuator is depressed; and a disengagement mechanism, disposed below the switch actuator, for receiving the pin mounted to the shaft of the switch actuator as the switch actuator is depressed, to disengage the shaft of the switch actuator from the rotor shaft and to maintain the switch actuator in an "actuated" position, the disengagement mechanism comprising:

a ramp for receiving the pin and guiding the shaft of the switch actuator into a disengaged position;

a stopping member mounted to the ramp for locating the switch actuator into an actuated position;

a curve-shape guide member adjacent to the stopping member for maintaining the switch actuator in an actuated position; and a pair of leaf springs mounted on opposite sides of the stopping member for selectively guiding the movement of the pin during actuation and deactuation of the switch actuator.

12. The single-phase variable reluctance motor system as defined in claim 11, further comprising a micro-switch having a switch activating member positioned with respect to the switch actuator such that the switch activating member contacts the pushing member of the switch actuator when depressed, said micro-switch operating to connect a power supply to to the energizing coil.

13. A method of starting a single-phase variable reluctance motor defined by a stator having a plurality of stator poles defining a principal axis, an energizing coil wound around at least one stator pole, a rotor having a plurality of rotor poles, the rotor being mounted on a rotatable shaft co-axial with the principal axis, wherein the energizing coil is energized by a circuit activated by movement of a starting member, the method comprising the steps of:

using the movement of the starting member to engage the rotatable shaft to set the rotor into rotation;

moving the starting member into a position disengaged from the rotatable shaft; and subsequently energizing the energizing coil.

14. A single-phase variable reluctance motor system, comprising:

a stator having a plurality of stator poles defining a principal axis;

an energization coil wound around at least one stator pole;

a rotor having a plurality of rotor poles, said rotor being mounted to a rotatable shaft co-axial with the principal axis of the stator;

a rotor positioning mechanism engagable with the rotatable shaft for placing the rotor in a predetermined position before power is supplied to the energizing coil, wherein the rotor positioning mechanism comprises:

a switch actuator defined by a shaft with first and second ends;

a pushing member mounted to the first end of the actuator shaft;

a pin mounted to the second end of the actuator shaft; and a disengagement mechanism, disposed adjacent to the second end of the actuator shaft, for receiving the pin mounted to the actuator shaft as the switch actuator is depressed, to guide the actuator shaft away from the rotatable shaft into a disengaged position and to maintain the switch actuator shaft in an "actuated" position.

15. The single-phase variable reluctance motor system as defined in claim 14, further comprising a micro-switch having a switch activating member positioned with respect to the switch actuator such that the switch activating member contacts the pushing member of the switch actuator when depressed, said micro-switch operating to connect a power supply to the energizing coils.

16. The single-phase variable reluctance motor system as defined in claim 15, wherein the shaft of the actuator has a curvilinear cut-out section along its mid-section which fits partially around, and is aligned adjacent to, the rotor shaft.

17. The single-phase variable reluctance motor system as defined in claim 16, wherein the rotor shaft has a flat section formed on its surface.

18. The single-phase variable reluctance motor system as defined in claim 14 wherein the stator poles are inwardly projecting and terminate at a central bore, wherein the rotor poles are outwardly projecting, and wherein the rotor is rotatably mounted to a shaft in the central bore.

19. A single-phase variable reluctance motor system, comprising:

a stator having a plurality of stator poles defining a principal axis;

an energizing coil wound around at least one stator pole;

a rotor shaft having a flat section formed on its surface;

a rotor having a plurality of rotor poles, the rotor being mounted to the rotor shaft co-axial with the principal axis of the stator;

a rotor positioning mechanism engagable with the rotor shaft for placing the rotor in a predetermined position before power is supplied to the energizing coil, the rotor positioning mechanism comprising:

a switch actuator defined by a shaft having first and second end, a straight portion, and a curvilinear cut-out section along its midsection which is sized to fit partially around and to receive the rotor shaft;

a disk-shaped pushing member mounted to a first end of the shaft;

a pin mounted to a second end of the shaft; and a spring element in contact with the switch actuator which urges the curvilinear cut-out section of the actuator shaft into engagement with the rotor shaft when the switch actuator is depressed, thereby rotating the rotor shaft until the flat portion is aligned with the straight portion of the actuator shaft.

20. The single-phase variable reluctance motor system as defined in claim 19, further comprising a disengagement mechanism, disposed adjacent to the second end of the actuator shaft, for receiving the pin mounted to the shaft of the switch actuator as the switch actuator is depressed, to disengage the shaft of the switch actuator from the rotor shaft and to maintain the switch actuator in an "actuated" position.

21. The single-phase variable reluctance motor system as defined in claim 20, wherein the disengagement mechanism comprises:

a ramp for receiving the pin and guiding the shaft of the switch actuator into a disengaged position;

a stopping member mounted to the ramp for locating the switch actuator into an actuated position;

a curve-shape guide member adjacent to the stopping member for maintaining the switch actuator in an actuated position; and a pair of leaf springs mounted on opposite sides of the stopping member for selectively guiding the movement of the pin during actuation and de-actuation of the switch actuator.

22. The single-phase variable reluctance motor system as defined in claim 21, further comprising a micro-switch having a switch activating member positioned with respect to the switch actuator such that the switch activating member contacts the pushing member of the switch actuator when depressed, said micro-switch operating to connect a power supply to the energizing coils.

23. A method of starting a single-phase variable reluctance motor to produce torque in a desired direction, wherein the motor is defined by a stator having projecting stator poles defining a principal axis, an energizing coil wound around at least one stator pole, a rotor having projecting rotor poles, said rotor being mounted on a rotatable shaft co-axial with the principal axis of the stator, the energizing coil being energized by a circuit enabled by movement of a starting member, the method comprising the steps of:

using the movement of the starting member to engage the rotatable shaft to position the rotor in a position where torque can be produced in the desired direction;

moving the starting member into a position disengaged from the rotatable shaft; and subsequently energizing the energizing coil.

24. A method of starting a single-phase variable reluctance motor coupled to a controller that is enabled by movement of a starting member, wherein the motor is defined by a stator having a plurality of inwardly projecting stator poles terminating at a central bore, an energizing coil wound around at least one stator pole, and a rotor having outwardly projecting rotor poles, the rotor being rotatably mounted to a shaft in the central bore, the method comprising the steps of:

using the movement of the starting member to engage the rotatable shaft to set the rotor into rotation;

moving the starting member into a position disengaged from the rotatable shaft; and energizing the energizing coil.

25. A method of starting a single-phase variable reluctance motor to produce torque in a desired direction, wherein the motor is defined by a stator having inwardly projecting stator poles terminating in a central bore, an energizing coil wound around at least one stator pole, a rotor having outwardly projecting rotor poles, said rotor being rotatably mounted to a shaft in the central bore, the energizing coil being energized in response to movement of a starting member, the method comprising the steps of:

using the movement of the starting member to engage the rotatable shaft to position the rotor in a position where torque can be produced in the desired direction;

moving the starting member into a position disengaged from the rotatable shaft; and energizing the energizing coil.

* * * * *